US011891972B2

(12) United States Patent
Miyake et al.

(10) Patent No.: US 11,891,972 B2
(45) Date of Patent: Feb. 6, 2024

(54) IGNITION DEVICE FOR INTERNAL COMBUSTION ENGINE

(71) Applicant: DENSO CORPORATION, Kariya (JP)

(72) Inventors: Keiko Miyake, Kariya (JP); Takashi Ohno, Kariya (JP); Kanechiyo Terada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/412,785

(22) Filed: Aug. 26, 2021

(65) Prior Publication Data

US 2021/0388805 A1 Dec. 16, 2021

Related U.S. Application Data

(63) Continuation of application No. PCT/JP2020/007544, filed on Feb. 25, 2020.

(30) Foreign Application Priority Data

Feb. 27, 2019 (JP) ................................ 2019-034821

(51) Int. Cl.
*F02P 3/04* (2006.01)
*H01T 15/00* (2006.01)

(52) U.S. Cl.
CPC ................ *F02P 3/04* (2013.01); *H01T 15/00* (2013.01)

(58) Field of Classification Search
CPC .... F02P 3/04; F02P 9/007; F02P 3/045; F02P 3/0453; F02P 3/0456; F02P 3/05
USPC .......................................................... 123/621
See application file for complete search history.

(56) References Cited

U.S. PATENT DOCUMENTS

| | | | | |
|---|---|---|---|---|
| 6,814,065 | B1 * | 11/2004 | Butler, Jr. | F02P 3/045 123/638 |
| 2017/0117078 | A1 * | 4/2017 | Kyouda | F02P 5/15 |
| 2017/0284356 | A1 * | 10/2017 | Takeda | F02P 9/002 |
| 2018/0223790 | A1 * | 8/2018 | Takeda | F02P 5/1502 |

FOREIGN PATENT DOCUMENTS

| | | | | |
|---|---|---|---|---|
| JP | 2015200284 A | * | 11/2015 | |
| JP | 6307994 | | 3/2018 | |
| WO | WO-2017026227 A1 | * | 2/2017 | F02P 3/055 |

* cited by examiner

*Primary Examiner* — Logan M Kraft
*Assistant Examiner* — Joshua Campbell
(74) *Attorney, Agent, or Firm* — Nixon & Vanderhye P.C.

(57) ABSTRACT

An ignition device for an internal combustion engine includes: an ignition plug; a primary coil; a secondary coil magnetically linked to the primary coil and connected to the ignition plug; a main ignition circuit causing a spark discharge to occur in the ignition plug; an energy supply circuit that supplies and stops electrical energy to the predetermined winding of the primary coil to accordingly cause the spark discharge to continue; a recirculation circuit that permits and prohibits current recirculation through a recirculation path including the predetermined winding; and a controller configured to: control the main ignition circuit, and determine a start time of a permission of the current recirculation by the recirculation circuit using, as a trigger, the interruption signal which causes the main ignition circuit to interrupt the current through the primary coil, and end the permission after a predetermined time period has elapsed since the start time.

15 Claims, 4 Drawing Sheets

IGNITION DEVICE FOR INTERNAL COMBUSTION ENGINE

CROSS-REFERENCE TO RELATED APPLICATION

The present application is a continuation application of International Application No. PCT/JP2020/007544, filed on Feb. 25, 2020, which claims priority to Japanese Patent Application No. 2019-034821, filed on Feb. 27, 2019. The contents of these applications are incorporated herein by reference in their entirety.

BACKGROUND

Technical Field

The present disclosure relates to an ignition device used for an internal combustion engine.

Background Art

Conventionally, an ignition device has been proposed that includes a main ignition circuit, which controls energization of a primary coil to cause a spark discharge at an ignition plug, and an energy supply circuit, which supplies electrical energy to the primary coil during the spark discharge, so that the spark discharge continues.

SUMMARY

In the present disclosure, provided is an ignition device for an internal combustion engine as the following.

The ignition device includes an ignition plug; a primary coil; a secondary coil; a main ignition circuit configured to cause a spark discharge to occur in the ignition plug; an energy supply circuit configured to supply and stop electrical energy to the predetermined winding of the primary coil to accordingly cause the spark discharge to continue; a recirculation circuit configured to permit and prohibit current recirculation through a recirculation path including the predetermined winding; and a controller configured to: control the main ignition circuit, send an interruption signal to the main ignition circuit to thereby cause the main ignition circuit to interrupt the current through the primary coil, and determine a start time of a permission of the current recirculation by the recirculation circuit using, as a trigger, the interruption signal, and end the permission after a predetermined time period has elapsed since the start time.

BRIEF DESCRIPTION OF THE DRAWINGS

The above-mentioned and other objects, features and advantages of this disclosure will become more apparent by reference to the following description taken in conjunction with the accompanying drawings, in which.

DETAILED DESCRIPTION OF THE PREFERRED EMBODIMENTS

[PTL 1] Japanese Patent No. 6307994

Figure 1:
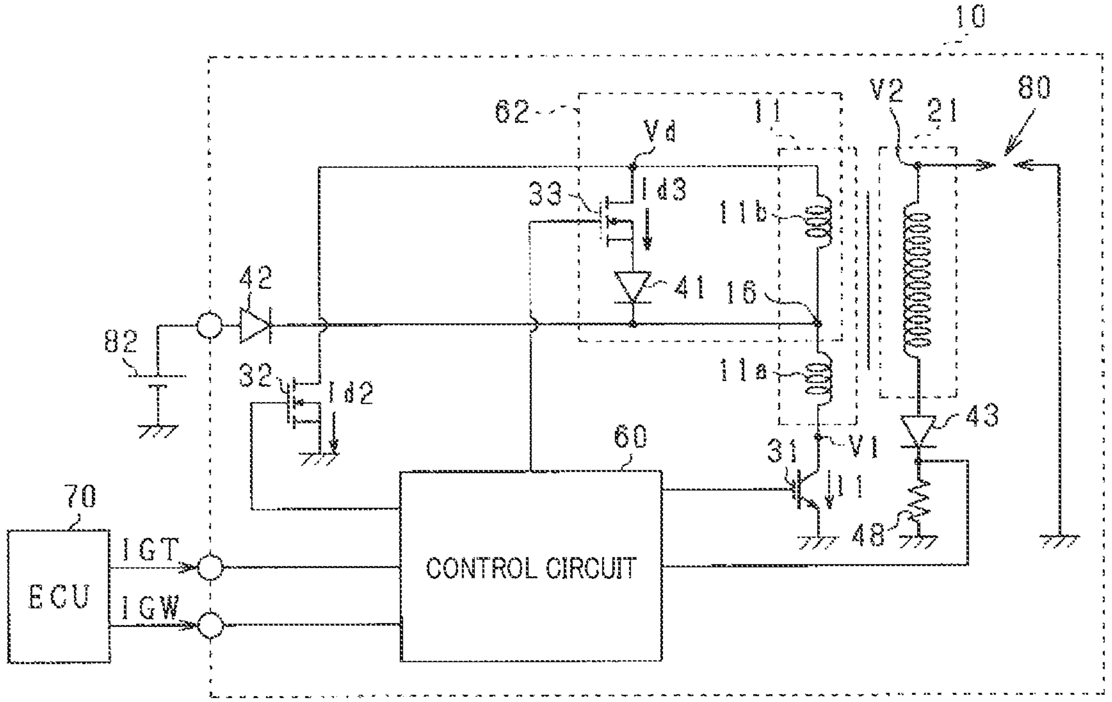
FIG. 1 is a circuit diagram showing an electrical configuration of an ignition device according to a first embodiment.

The discloser of the present application has focused on the fact that, in the ignition device disclosed in PTL 1, when electrical energy is not consumed in a circuit including a secondary coil due to a missing or short spark discharge during main ignition, electrical energy returns from the secondary coil to the primary coil. In this case, a high voltage occurs in the primary coil, which may possibly cause excessive voltage stress to be applied to the energy supply circuit.

The present disclosure has been accomplished to solve the above problem and mainly aims at inhibiting excessive voltage stress from being applied to an energy supply circuit in an ignition device including the energy supply circuit.

The first means for solving the above problem includes an ignition device for an internal combustion engine. The ignition device includes an ignition plug; a primary coil that includes a predetermined winding; a secondary coil configured to be magnetically linked to the primary coil and be connected to the ignition plug; a main ignition circuit configured to supply and interrupt a current through the primary coil to accordingly cause a spark discharge to occur in the ignition plug; an energy supply circuit configured to supply and stop electrical energy to the predetermined winding of the primary coil to accordingly cause the spark discharge to continue; a recirculation circuit configured to permit and prohibit current recirculation through a recirculation path including the predetermined winding; and a controller configured to: control the main ignition circuit, send an interruption signal to the main ignition circuit to thereby cause the main ignition circuit to interrupt the current through the primary coil, and determine a start time of a permission of the current recirculation by the recirculation circuit using, as a trigger, the interruption signal, and end the permission after a predetermined time period has elapsed since the start time.

According to the above configuration, the main ignition circuit supplies and interrupts a current through the primary coil to accordingly cause a spark discharge to occur in the ignition plug. The energy supply circuit supplies and stops electrical energy to the predetermined winding of the primary coil to accordingly cause the spark discharge to continue. The recirculation circuit permits and prohibits current recirculation through a recirculation path including the predetermined winding.

The controller controls the main ignition circuit to supply and interrupt the current through the primary coil. At this time, when electrical energy is not consumed in a circuit including the secondary coil due to a missing or short spark discharge in the ignition plug, a high voltage occurs in the primary coil as described above, which may possibly cause excessive voltage stress to be applied to the energy supply circuit.

In this respect, the controller sends an interruption signal to the main ignition circuit to thereby cause the main ignition circuit to interrupt the current through the primary coil, and determines a start time of a permission of the current recirculation by the recirculation circuit using, as a trigger, the interruption signal. Thus, even if a high voltage occurs in the predetermined winding of the primary coil, the current is recirculated through the recirculation path, which inhibits excessive voltage stress from being applied to the energy supply circuit. Furthermore, since the controller determines the start time of the permission of the current recirculation using the interruption signal as a trigger, the current is promptly recirculated through the recirculation path before excessive voltage stress is applied to the energy supply circuit. The controller ends the permission after a predetermined time period has elapsed since the start time, that is, i.e. prohibits the circuit recirculation by the recirculation circuit.

In the second means, the controller is configured to: receive a main ignition signal of a high level or a low level, energize the main ignition circuit at rising of the main ignition signal, and use falling of the main ignition signal as the interruption signal to interrupt the main ignition circuit and start the permission of the current recirculation by the recirculation circuit at the falling of the main ignition signal.

According to the above configuration, the controller is configured to set an end time of the permission of the current recirculation by the recirculation circuit to be before the main ignition circuit starting the supply of a current through the primary coil next time.

In the third means, the controller sets an end time of the permission of the current recirculation by the recirculation circuit to be before starting the passing of a current next by the main ignition circuit. With such a configuration, the recirculation of a current through the recirculation path is inhibited from affecting the passing of a current by the main ignition circuit.

In the fourth means, the controller is configured to end the permission of the current recirculation by the recirculation circuit at the next rising of the main ignition signal.

According to the above configuration, the controller ends the permission of the current recirculation by the recirculation circuit at the next rising of the main ignition signal. Thus, the time to end the permission of the current recirculation by the recirculation circuit is easily and accurately determined.

The fifth means includes an ignition device for an internal combustion engine. The ignition device includes an ignition plug, a primary coil that includes a predetermined winding; a secondary coil configured to be magnetically linked to the primary coil and be connected to the ignition plug; a main ignition circuit configured to supply and interrupt a current through the primary coil to accordingly cause a spark discharge to occur in the ignition plug; an energy supply circuit configured to supply and stop electrical energy to the predetermined winding of the primary coil to accordingly cause the spark discharge to continue; a recirculation circuit configured to permit and prohibit current recirculation through a recirculation path including the predetermined winding; and a controller configured to: control the main ignition circuit, start a permission of the current recirculation by the recirculation circuit after the current through the primary coil is interrupted by the main ignition circuit, and set an end time of the permission of the current recirculation to be before the main ignition circuit starting the supply of a current through the primary coil next time.

According to the above configuration, the controller starts the permission of the current recirculation by the recirculation circuit after the current through the primary coil is interrupted by the main ignition circuit. Thus, even if a high voltage occurs at the predetermined winding of the primary coil, the current is recirculated through the recirculation path, which inhibits excessive voltage stress from being applied to the energy supply circuit. Furthermore, the controller sets an end time of the permission of the current recirculation to be before the main ignition circuit starting the supply of a current through the primary coil next time. Thus, the same operational advantages as those of the third means are achieved.

In the sixth means, the controller is configured to: receive a main ignition signal of a high level or a low level, energize the main ignition circuit at rising of the main ignition signal, interrupt the main ignition circuit at falling of the main ignition signal, and end the permission of the current recirculation by the recirculation circuit at the next rising of the main ignition signal.

After the main ignition by inductive discharge, which causes a spark discharge to occur in the ignition plug by supplying and interrupting a current through the primary coil, ignition by energy supply, which causes the spark discharge to continue, is sometimes executed and sometimes not executed by the energy supply circuit. Even when the ignition by energy supply is not executed, excessive voltage stress may possibly be applied to the energy supply circuit due to a high voltage caused in the primary coil as described above.

In this respect, in the seventh means, the controller is configured to execute the permission of the current recirculation by the recirculation circuit in response to the energy supply circuit failing to execute ignition by energy supply to cause the spark discharge to continue, after the current through the primary coil is interrupted by the main ignition circuit. With such a configuration, even when the ignition by energy supply is not executed, excessive voltage stress is inhibited from being applied to the energy supply circuit.

Even when the ignition by energy supply is executed, excessive voltage stress may possibly be applied to the energy supply circuit due to a high voltage caused in the primary coil as described above.

In this respect, in the eighth means, the controller is configured to execute the permission of the current recirculation by the recirculation circuit, in response to the energy supply circuit executing ignition by energy supply to cause the spark discharge to continue, after the current through the primary coil is interrupted by the main ignition circuit. With such a configuration, even when the ignition by energy supply is executed, excessive voltage stress is inhibited from being applied to the energy supply circuit.

In the ninth means, the controller is configured to, in response to execution of the ignition by energy supply, maintain a state in which current recirculation through the recirculation path is permitted by the recirculation circuit, and cause the energy supply circuit to supply and stop the electrical energy to the predetermined winding.

According to the above configuration, the controller is configured to, in response to execution of the ignition by energy supply, maintain a state in which current recirculation through the recirculation path is permitted by the recirculation circuit. Thus, even if a high voltage occurs in the predetermined winding of the primary coil, the current is recirculated through the recirculation path, which inhibits excessive voltage stress from being applied to the energy supply circuit.

When electrical energy is stopped after being supplied to the predetermined winding by the energy supply circuit, the energy supply is instantaneously stopped, thereby a secondary current is rapidly decreased, or an induced electromotive force occurs in the predetermined winding. This may possibly cause excessive voltage stress to be applied to the energy supply circuit. In this respect, since the state in which current recirculation through the recirculation path is permitted by the recirculation circuit is maintained when electrical energy is stopped after being supplied to the predetermined winding by the energy supply circuit, the energy supply can be gradually decreased, a rapid decrease in the secondary current can be inhibited, and the current caused by the induced electromotive force generated in the predetermined winding can be recirculated through the recirculation path. Thus, the recirculation path through which the current is recirculated during the ignition by energy supply is also used as the recirculation path through which the current is recirculated when electrical energy is not consumed in the circuit including the secondary coil.

First Embodiment

Hereinafter, an ignition device according to a first embodiment will be described with reference to the drawings. The ignition device is applied to a multi-cylinder gasoline engine (internal combustion engine) mounted on a vehicle. The engine is, for example, an in-cylinder direct injection engine that is capable of operating in a lean-burn mode and includes a rotational flow controller, which causes rotational flow (such as tumble flow and swirl flow) of an air-fuel mixture in the cylinders. The ignition device ignites (fires) the air-fuel mixture in each combustion chamber of the engine at a predetermined ignition timing. The ignition device is of a direct ignition (DI) type and uses an ignition coil corresponding to an ignition plug of each cylinder.

As shown in FIG. 1, an ignition device 10 (ignition device for an internal combustion engine) controls energization of a primary coil 11 of the ignition coil on the basis of instruction signals (a main ignition signal IGT and an energy supply signal IGW) supplied from an engine electronic control unit (ECU) 70, which configures the center of the engine control. The ignition device 10 controls electrical energy that occurs in a secondary coil 21 of the ignition coil by controlling the energization of the primary coil 11, thereby controlling a spark discharge that occurs at an ignition plug 80.

The ECU 70 generates and outputs the main ignition signal IGT and the energy supply signal IGW in accordance with engine parameters (such as a warm-up state, an engine rotational speed, and an engine load) acquired from a variety of sensors and the control state of the engine (such as the presence/absence of lean burn and the degree of rotational flow).

The ignition device 10 includes the ignition plug 80, the primary coil 11, the secondary coil 21, switching elements 31 to 33, diodes 41 to 43, a current detection resistance 48, and a control circuit 60. The ignition plug 80 is mounted on each cylinder of the engine. Although the primary coil 11 and the secondary coil 21 are provided for each ignition plug 80, the structure corresponding to one ignition plug 80 will be described as an example. The components of the ignition device 10 are housed in a case that accommodates the primary coil 11 and the secondary coil 21.

The ignition plug 80, which has a known structure, includes a center electrode, which is connected to one end of the secondary coil 21, and an outside electrode, which is connected (grounded) to the GND through, for example, the cylinder head of the engine. The other end of the secondary coil 21 is connected (grounded) to the GND through the diode 43 and the current detection resistance 48. The anode of the diode 43 is connected to the secondary coil 21, and the cathode of the diode 43 is connected to the current detection resistance 48. The current detection resistance 48 detects a secondary current that flows through the secondary coil 21. The output of the current detection resistance 48 is supplied to the control circuit 60. The diode 43 inhibits a spark discharge that occurs by an unwanted voltage caused during energization of the primary coil 11. The ignition plug 80 causes a spark discharge between the center electrode and the outside electrode by electrical energy that occurs in the secondary coil 21.

The ignition coil includes the primary coil 11 and the secondary coil 21, which is magnetically linked to the primary coil 11. The number of turns of the secondary coil 21 is greater than the number of turns of the primary coil 11.

The primary coil 11 includes an intermediate tap 16. A winding of the primary coil 11 on one side of the intermediate tap 16 is a first winding 11*a*, and a winding of the primary coil 11 on the other side of the intermediate tap 16 is a second winding 11*b*. The number of turns of the first winding 11*a* is greater than the number of turns of the second winding 11*b*.

The intermediate tap 16 is connected to a battery 82 through the diode 42. The battery 82 is, for example, a known lead battery and supplies a voltage of 12 V. The anode of the diode 42 is connected to the battery 82, and the cathode of the diode 42 is connected to the intermediate tap 16.

The end of the first winding 11*a* closer to the GND (the end further from the intermediate tap 16) is connected to the switching element 31. The switching element 31 (first switch) is a semiconductor switching element such as an insulated gate bipolar transistor (IGBT). The output terminal of the switching element 31 is connected (grounded) to the GND. The switching element 31 connects and disconnects the first winding 11*a* and the GND in response to the signal from the control circuit 60. Thus, the switching element 31 (main ignition circuit) energizes and interrupts a current through the first winding 11*a* (primary coil) to make the ignition plug 80 cause the spark discharge.

The end of the second winding 11*b* further from the intermediate tap 16 is connected to the GND through the switching element 32. The switching element 32 (second switch) is a semiconductor switching element such as a metal-oxide semiconductor (MOS) transistor. The switching element 32 connects and disconnects the second winding 11*b* and the GND in response to the signal from the control circuit 60. Thus, the switching element 32 (energy supply circuit) supplies and stops electrical energy to the second winding 11*b* (predetermined winding), which is included in the primary coil 11, to make the spark discharge continue.

Both ends of the second winding 11*b* are connected to each other through the switching element 33 and the diode 41. The switching element 33 (third switch) is a semiconductor switching element such as a MOS transistor. The anode of the diode 41 is connected to the switching element 33, and the cathode of the diode 41 is connected to the intermediate tap 16. The second winding 11*b*, the switching element 33, and the diode 41 are annularly connected. A annular passage including the second winding 11*b*, the switching element 33, and the diode 41 forms a recirculation path 62. The switching element 33 (recirculation circuit) permits and prohibits recirculation of a current through the recirculation path 62.

The control circuit 60 (controller) includes, for example, an input-output interface and a drive circuit. The control circuit 60 controls the connection and disconnection states of the switching elements 31 to 33 in accordance with, for example, the signals from the ECU 70 and the output of the current detection resistance 48. Thus, the control circuit 60 selects and executes one of two ignition modes including "main ignition by inductive discharge" and "ignition by energy supply".

Figure 2:
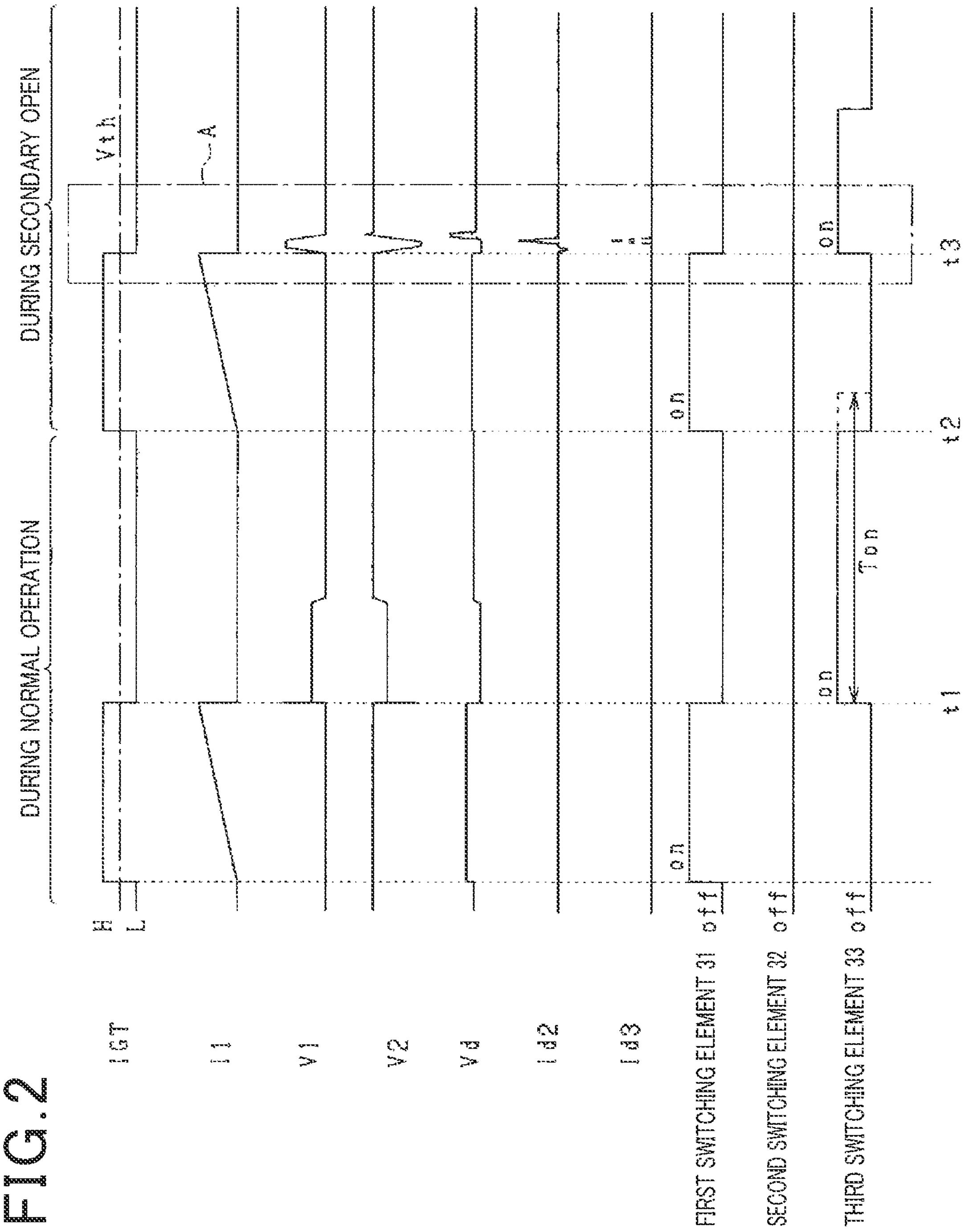
FIG. 2 is a timing diagram showing how main ignition by inductive discharge is performed.

FIG. 2 is a timing diagram showing how the main ignition by inductive discharge is performed. The left half of FIG. 2 shows the operation during normal operation.

In the main ignition by inductive discharge, the control circuit 60 controls the switching element 31 (first switch 31) to be in an ON state (connected state) during a time period in which the main ignition signal IGT from the ECU 70 is at a high level (H). Thus, the voltage (battery voltage) of the battery 82 is supplied to the first winding 11*a* of the primary coil 11. This increases a primary current I1, and at a time t1 at which the main ignition signal IGT is brought into a low level (L), the control circuit 60 controls the switching element 31 to be in an OFF state (disconnected state). Thus, a high voltage occurs in the first winding 11*a* and the secondary coil 21, causing a spark discharge in the ignition plug 80, and the secondary current flows through the secondary coil 21. Subsequently, the secondary current attenuates. When the secondary current becomes less than a discharge-maintaining current, which is the minimum current that can maintain the discharge, the discharge in the ignition plug 80 ends.

In the ignition by energy supply, the control circuit 60 controls the switching element 33 (third switch 33) to be in the ON state after starting the main ignition by inductive discharge as described above. Subsequently, the control circuit 60 controls the switching element 32 to be in the ON state and the OFF state alternately based on the energy supply signal IGW from the ECU 70. Here, the number of turns of the second winding 11*b* through which a current Id2 (refer to FIG. 1) flows is less than the number of turns of the first winding 11*a*. Thus, a current is supplied at a voltage higher than a discharge-maintaining voltage Vm, which is a voltage necessary for maintaining the discharge in the ignition plug 80, and the secondary current in the same direction as the current that flows during the main ignition by inductive discharge is additionally supplied through the secondary coil 21. For example, the control circuit 60 sets a target secondary current based on the time difference between the rising of the main ignition signal IGT and the rising of the energy supply signal IGW. The control circuit 60 detects the rising of the main ignition signal IGT upon transition of the voltage level of the main ignition signal IGT from a state lower than a threshold value Vth to a state higher than the threshold value Vth. The control circuit 60 starts controlling the switching element 32 at the falling of the main ignition signal IGT and controls the switching element 32 to be in the ON state and the OFF state so that the secondary current detected by the current detection resistance 48 becomes equal to the target secondary current. The control circuit 60 detects the falling of the main ignition signal IGT upon transition of the voltage level of the main ignition signal IGT from the state higher than the threshold value Vth to the state lower than the threshold value Vth. The control circuit 60 ends the controlling of the switching element 32 at the falling of the energy supply signal IGW.

In the main ignition by inductive discharge, the control circuit 60 controls the switching element 31 to supply and interrupt a current through the first winding 11*a* (primary coil). At this time, when electrical energy is not consumed in the circuit including the secondary coil 21 due to a missing or short spark discharge in the ignition plug 80, electrical energy returns from the secondary coil 21 to the primary coil 11. For example, if a missing or short spark discharge occurs during the main ignition by inductive discharge, a high voltage occurs in the secondary coil 21 that starts from the negative polarity and attenuates while alternating the polarity. When an alternating high voltage occurs in the secondary coil 21, an alternating high voltage without a load also occurs in the primary coil 11 in accordance with the turns ratio. Thus, excessive voltage stress may possibly be applied to the switching element 32.

Given these circumstances, the control circuit 60 starts permitting the recirculation by the switching element 33 (third switch 33) after the current is interrupted by the switching element 31 (first switch 31). That is, after the current is interrupted by the switching element 31, the control circuit 60 executes permission of the current recirculation by the switching element 33 when the ignition by energy supply is not executed. In concrete terms, a start time of the permission of the current recirculation by the switching element 33 is determined using, as a trigger, an interruption signal, which is a signal that causes the switching element 31 to execute interruption of a current. More specifically, the control circuit 60 energizes the switching element 31 at the rising of the main ignition signal IGT and uses the falling of the main ignition signal IGT as the interruption signal to interrupt the switching element 31 and start the permission of the current recirculation by the switching element 33 at the falling of the main ignition signal IGT.

The control circuit 60 ends the permission of the current recirculation after a predetermined time period has elapsed since the start time. In concrete terms, the control circuit 60 sets an end time of the permission of the current recirculation to a time t2 or earlier at which energization of a current is started next by the switching element 31. More specifically, the control circuit 60 ends the permission of the current recirculation by the switching element 33 at a rising time t2 of the next main ignition signal IGT. Note that, when the time period from the start time (time t1) of the recirculation to the next rising time t2 of the main ignition signal IGT is longer than a reference time period Ton, the control circuit 60 ends the permission of the current recirculation by the switching element 33 at a point in time when the reference time period Ton has elapsed. The reference time period Ton is set to a time period during which the voltage that occurs in the second winding 11*b* attenuates to less than a voltage Va (refer to FIG. 3) at which an avalanche breakdown occurs in the switching element 32.

Figure 3:
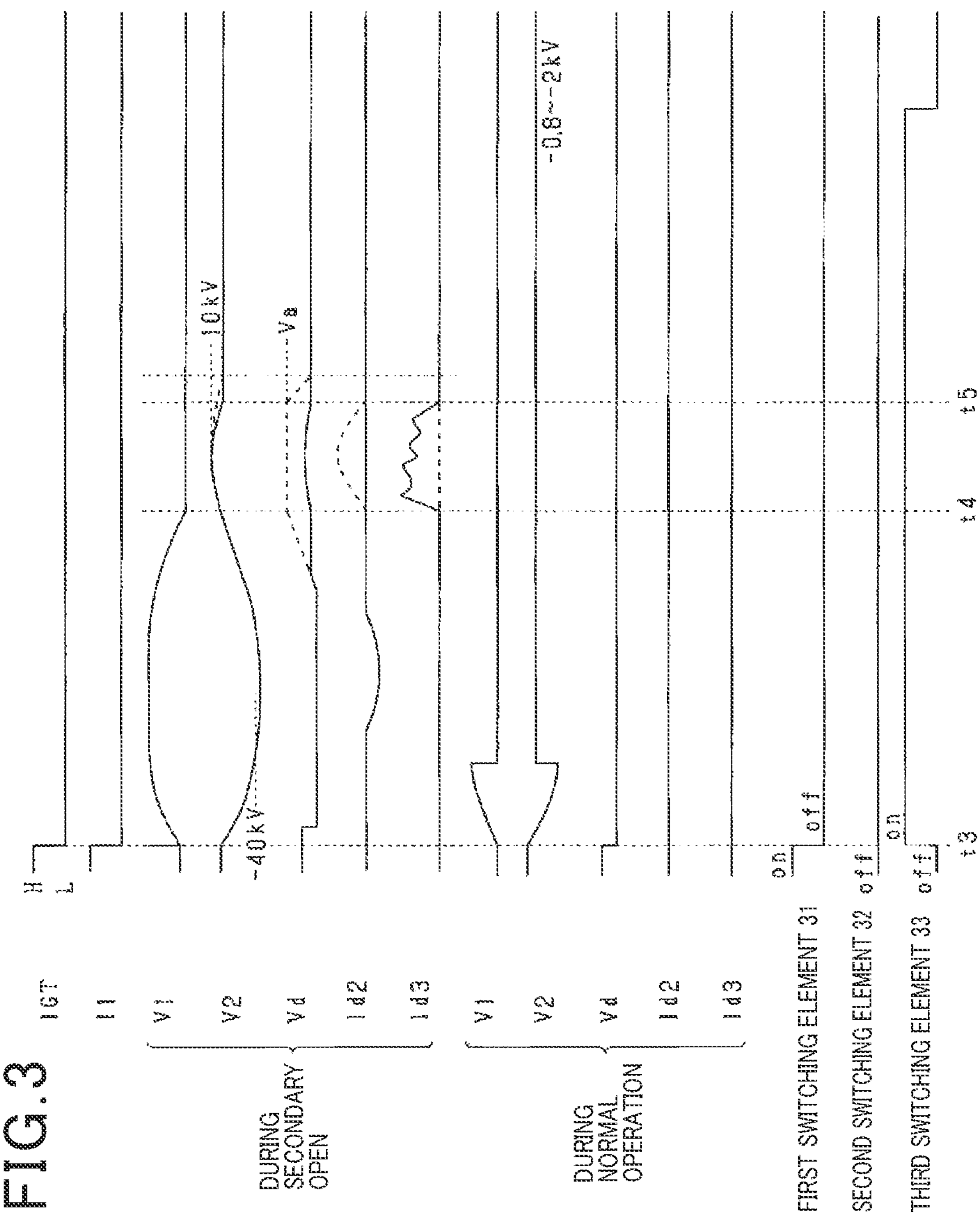
FIG. 3 is a timing diagram showing region A of FIG. 2 that has been enlarged.

The right half of FIG. 2 shows the operation during secondary open when a missing or short spark discharge occurs in the ignition plug 80, that is, when the path of the spark discharge is open. FIG. 3 is an enlarged view of region A of FIG. 2. FIG. 3 also shows the operation during normal operation.

As shown in FIG. 3, at the time t3, although the main ignition signal IGT falls and a high voltage occurs in the first winding 11*a* and the secondary coil 21, a spark discharge has not occurred in the ignition plug 80. Thus, electrical energy of the secondary coil 21 cannot escape, so that a secondary voltage V2 of the secondary coil 21 will be an excessive negative voltage. Because of this secondary voltage V2, the primary voltage V1 of the primary coil 11 will be an excessive positive voltage corresponding to the turns ratio. After that, although the secondary voltage V2 attenuates while alternating the polarity, the high-voltage state is maintained until close to a time t5.

Here, the operation of a comparative example in which the ignition device 10 does not include the switching element 33 or the diode 41 (that is, the recirculation path 62)

is shown by broken lines, and the operation of the present embodiment is shown by solid lines.

In the comparative example, as shown by broken lines, at a time t4, a voltage Vd (refer to FIG. 1) across the second winding 11*b* and the switching element 32 exceeds the voltage Va, causing the current Id2 of the switching element 32 to increase. That is, excessive voltage stress is applied to the switching element 32, and an avalanche breakdown occurs in the switching element 32. Subsequently, at the time t5, when the voltage Vd becomes less than the voltage Va, the avalanche breakdown in the switching element 32 ends, causing the current Id2 of the switching element 32 to become 0. Note that, to simply prevent the avalanche breakdown in the switching element 32, it is necessary to use a high withstand voltage or high resistance switching element for the switching element 32.

In the present embodiment, as shown by solid lines, at the falling (time t3) of the main ignition signal IGT, the switching element 31 is interrupted, and the permission of the current recirculation by the switching element 33 (third switch 33) is started. Thus, at the time t4, even when the voltage Vd increases, a current Id3 of the switching element 33 (refer to FIG. 1) increases while the current Id2 of the switching element 32 does not increase. That is, the current caused by the induced electromotive force generated in the second winding 11*b* recirculates through the recirculation path 62. After that, at the time t5, the voltage Vd becomes 0, so that the current Id3 of the switching element 33 becomes 0.

Furthermore, even when the ignition by energy supply is being executed, excessive voltage stress may possibly be applied to the switching element 32 due to a high voltage that occurs in the primary coil 11 as described above after starting the main ignition by inductive discharge.

For this reason, in the present embodiment, the control circuit 60 executes the permission of the current recirculation by the switching element 33 during execution of the ignition by energy supply after the current is interrupted by the switching element 31. In concrete terms, the control circuit 60 maintains the state in which the recirculation of a current through the recirculation path 62 is permitted by the switching element 33 during execution of the ignition by energy supply. Thus, even if a high voltage occurs in the second winding 11*b* included in the primary coil 11, the current recirculates through the recirculation path 62.

When electrical energy is stopped after being supplied to the second winding 11*b* by the switching element 32, an induced electromotive force occurs in the second winding 11*b*, which may possibly cause excessive voltage stress to be applied to the switching element 32. In this respect, the state in which the recirculation of a current through the recirculation path 62 is permitted is maintained when electrical energy is stopped after being supplied to the second winding 11*b* by the switching element 32. Thus, the current caused by the induced electromotive force generated in the second winding 11*b* also recirculates through the recirculation path 62.

The present embodiment described above has the following advantages.

The control circuit 60 starts the permission of the current recirculation by the switching element 33 after the current is interrupted by the switching element 31. Thus, even if a high voltage occurs in the second winding 11*b* included in the primary coil 11, the current is recirculated through the recirculation path 62, which inhibits excessive voltage stress from being applied to the switching element 32. As a result, the withstand voltage and the resistance of the switching element 32 can be decreased.

The control circuit 60 determines the start time of the permission of the current recirculation by the switching element 33 using, as a trigger, the interruption signal, which is a signal that causes the switching element 31 to execute interruption of a current. Thus, the current is recirculated through the recirculation path 62 promptly before excessive voltage stress is applied to the switching element 32.

The control circuit 60 receives the main ignition signal IGT of a high level or a low level, energizes the switching element 31 at the rising of the main ignition signal IGT, and interrupts the switching element 31 at the falling of the main ignition signal IGT. Thus, the control circuit 60 controls the supply and interruption of a current through the switching element 31 using the main ignition signal IGT, which is in common use. The control circuit 60 uses the falling of the main ignition signal IGT as the interruption signal and starts the permission of the current recirculation by the switching element 33 at the falling of the main ignition signal IGT. Thus, the point in time to start the permission of the current recirculation by the switching element 33 is easily and accurately determined.

The control circuit 60 sets the end time of the permission of the current recirculation by the switching element 33 to be before a point in time at which supply of a current is started next by the switching element 31. Thus, the recirculation of a current through the recirculation path 62 is inhibited from affecting the supply of a current by the switching element 31.

The control circuit 60 ends the permission of the current recirculation by the switching element 33 at the next rising of the main ignition signal IGT. Thus, the point in time to end the permission of the current recirculation by the switching element 33 is easily and accurately determined.

The control circuit 60 executes the permission of the current recirculation by the switching element 33 when the ignition by energy supply, which makes the spark discharge continue, is not being executed by the switching element 32 after the current is interrupted by the switching element 31. With this configuration, excessive voltage stress is inhibited from being applied to the switching element 32 even when the ignition by energy supply is not executed while the main ignition by inductive discharge is executed.

The control circuit 60 executes the permission of the current recirculation by the switching element 33 during execution, by the switching element 32, of the ignition by energy supply, which makes the spark discharge continue, after the current is interrupted by the switching element 31. With this configuration, excessive voltage stress is inhibited from being applied to the switching element 32 even when the ignition by energy supply is executed.

The control circuit 60 maintains the state in which the recirculation of a current through the recirculation path 62 is permitted by the switching element 33 during execution of the ignition by energy supply. Thus, even if a high voltage occurs in the second winding 11*b* included in the primary coil 11, the current is recirculated through the recirculation path 62, which inhibits excessive voltage stress from being applied to the switching element 32.

When electrical energy is stopped after being supplied to the second winding 11*b* by the switching element 32, the state in which the recirculation of a current through the recirculation path 62 is permitted is maintained. Thus, the current caused by the induced electromotive force generated in the second winding 11*b* is recirculated through the recirculation path 62. Therefore, the recirculation path 62 that recirculates the current during the ignition by energy supply is also used as the recirculation path 62 that recirculates the current when electrical energy is not consumed in the circuit including the secondary coil 21.

Second Embodiment

Figure 4:
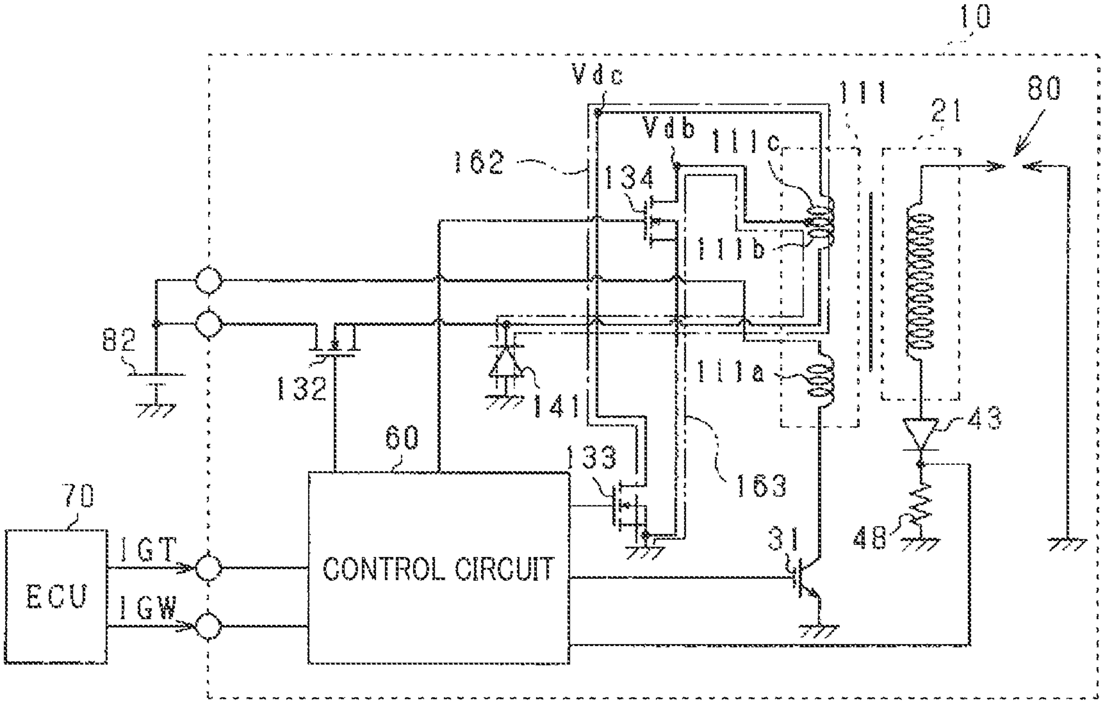
FIG. 4 is a circuit diagram showing an electrical configuration of an ignition device according to a second embodiment.

Hereinafter, a second embodiment will be described with reference to FIG. 4 centering on the differences from the first embodiment. Like or the same reference numerals are given to those components that are like or the same as the corresponding components of the first embodiment, and the description is omitted.

In the ignition device 10 of the present embodiment, a primary coil 111 includes a first winding 111*a*, a second winding 111*b*, and a third winding 111*c*. One end of the first winding 111*a* is connected to the switching element 31 (first switch), and the other end of the first winding 111*a* is connected to the battery 82. One end of the second winding 111*b* (predetermined winding) is connected to the battery 82 through a switching element 132 (second switch). The other end of the second winding 111*b* is connected to the GND through a switching element 134 (fourth switch) and is connected to one end of the third winding 111*c*. The other end of the third winding 111*c* (predetermined winding) is connected to the GND through a switching element 133 (third switch). The cathode of a diode 141 is connected to a path between the second winding 111*b* and the switching element 132. The anode of the diode 141 is connected to the GND.

In the main ignition by inductive discharge, the control circuit 60 controls the switching element 31 to be in the ON state during the time period in which the main ignition signal IGT from the ECU 70 is at the high level (H). Thus, the voltage of the battery 82 is supplied to the first winding 111*a* of the primary coil 111. When the primary current is increased, and the main ignition signal IGT is brought into the low level (L), the control circuit 60 controls the switching element 31 to be in the OFF state. Thus, a high voltage occurs in the first winding 111*a* and the secondary coil 21, causing the spark discharge in the ignition plug 80, and the secondary current flows through the secondary coil 21. Subsequently, when the secondary current attenuates and becomes less than the discharge-maintaining current, which is the minimum current that can maintain the discharge, the discharge in the ignition plug 80 ends.

In the ignition by energy supply, the control circuit 60 executes a first input control procedure or a second input control procedure as follows after starting the main ignition by inductive discharge as described above.

In the first input control procedure, the switching element 133 is controlled to be in the ON state. Subsequently, the control circuit 60 controls the switching element 132 to be in the ON state and the OFF state alternately based on the energy supply signal IGW from the ECU 70. Note that, the switching elements 132 to 134 configure an energy supply circuit.

In the second input control procedure, the switching element 134 is controlled to be in the ON state. Subsequently, the control circuit 60 controls the switching element 132 to be in the ON state and the OFF state alternately based on the energy supply signal IGW from the ECU 70. The ECU 70 can change the secondary voltage that occurs in the secondary coil 21 during the ignition by energy supply by switching between the first input control procedure and the second input control procedure.

Other control methods of the ignition by energy supply are the same as those of the ignition by energy supply of the first embodiment.

During the main ignition by inductive discharge, the control circuit 60 (controller) executes a first recirculation control procedure or a second recirculation control procedure as follows.

In the first recirculation control procedure, the falling of the main ignition signal IGT is used as the interruption signal to interrupt the switching element 31 and start the permission of the current recirculation by the switching element 133 (recirculation circuit) at the falling of the main ignition signal IGT. In this case, a first recirculation path 162 including the GND, the diode 141, the second winding 111*b*, the third winding 111*c*, the switching element 133, and the GND in this order is formed. Thus, even if a high voltage occurs in the second winding 111*b* and the third winding 111*c* included in the primary coil 111, the current is recirculated through the first recirculation path, which inhibits excessive voltage stress from being applied to the switching elements 132 and 133. Subsequently, the control circuit 60 ends the permission of the current recirculation by the switching element 133 at the next rising point in time of the main ignition signal IGT.

In the second recirculation control procedure, the falling of the main ignition signal IGT is used as the interruption signal to interrupt the switching element 31 and start the permission of the current recirculation by the switching element 133 (recirculation circuit) and the switching element 134 (recirculation circuit) at the falling of the main ignition signal IGT. In this case, the first recirculation path and a second recirculation path 163, which includes the GND, the diode 141, the second winding 111*b*, the switching element 134, and the GND in this order, are formed. Thus, even if a high voltage occurs in the second winding 111*b* and the third winding 111*c* included in the primary coil 11, the current is recirculated through the first recirculation path and the second recirculation path, which inhibits excessive voltage stress from being applied to the switching elements 132 to 134. Subsequently, the control circuit 60 ends the permission of the current recirculation by the switching element 133 and the switching element 134 at the next rising point in time of the main ignition signal IGT.

Additionally, in the first input control procedure, the control circuit 60 executes the permission of the current recirculation by the switching element 133 during execution of the ignition by energy supply after the current is interrupted by the switching element 31. In concrete terms, during execution of the first input control procedure, the control circuit 60 maintains the state in which the recirculation of a current through the first recirculation path is permitted by the switching element 133. Thus, even if a high voltage occurs in the second winding 111*b* and the third winding 111*c*, which are included in the primary coil 11, the current is recirculated through the first recirculation path. The first recirculation path also recirculates the current caused by the induced electromotive force generated in the second winding 111*b* and the third winding 111*c* when electrical energy is stopped after being supplied to the second winding 111*b* and the third winding 111*c* by the switching element 132. Thus, the first recirculation path that recirculates the current in the first input control procedure is also used as the first recirculation path that recirculates the current when electrical energy is not consumed in the circuit including the secondary coil 21.

In the second input control procedure, the control circuit 60 executes the permission of the current recirculation by the switching element 134 during execution of the ignition by energy supply after the current is interrupted by the switching element 31. In concrete terms, the control circuit 60 maintains the state in which the recirculation of a current through the second recirculation path is permitted by the switching element 134 during execution of the second input control procedure. Thus, even if a high voltage occurs in the second winding 111*b* included in the primary coil 11, the current is recirculated through the second recirculation path. Furthermore, the second recirculation path also recirculates the current caused by the induced electromotive force generated in the second winding 111*b* when electrical energy is stopped after being supplied to the second winding 111*b* by the switching element 132. Thus, the second recirculation path that recirculates the current during the second input control procedure is also used as the second recirculation path that recirculates the current when electrical energy is not consumed in the circuit including the secondary coil 21.

The second embodiment may be modified as follows.

After controlling the switching element 133 and the switching element 134 to be in the ON state, the control circuit 60 may execute a third input control procedure to control the switching element 132 to be in the ON state and the OFF state alternately based on the energy supply signal IGW from the ECU 70.

The control circuit 60 may execute a third recirculation control procedure that uses the falling of the main ignition signal IGT as the interruption signal to interrupt the switching element 31 and start the permission of the current recirculation by the switching element 134 (recirculation circuit) at the falling of the main ignition signal IGT. In this case, the second recirculation path is formed while the first recirculation path is not formed.

Third Embodiment

Figure 5:
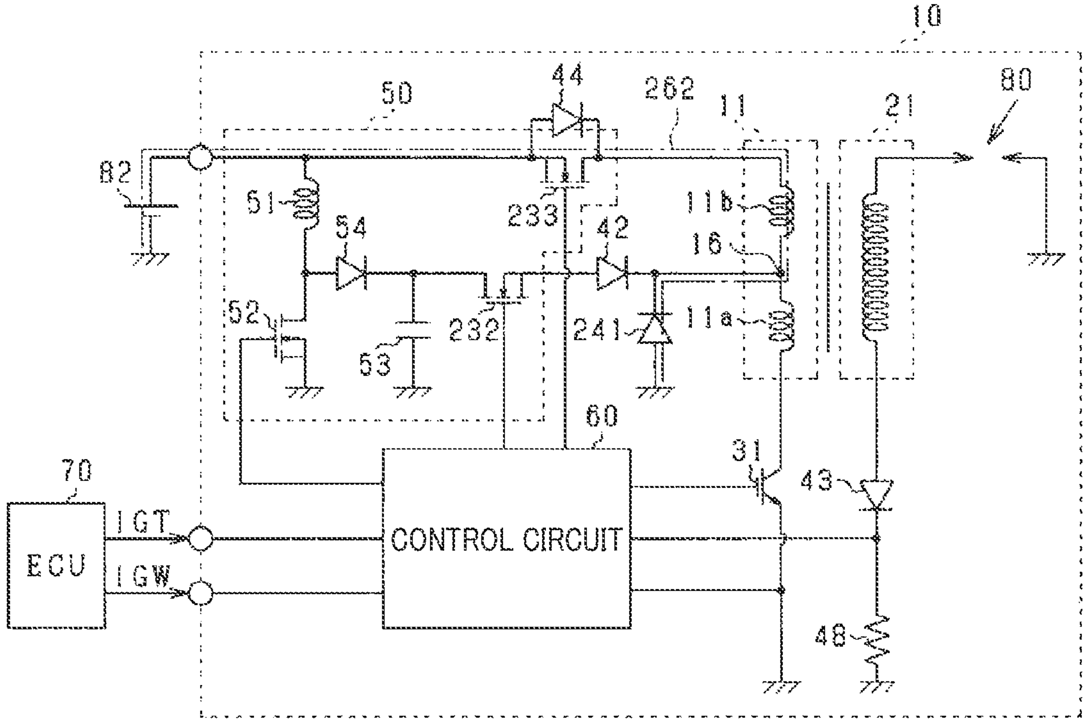
FIG. 5 is a circuit diagram showing an electrical configuration of an ignition device according to a third embodiment.

Hereinafter, a third embodiment will be described with reference to FIG. 5 centering on the differences from the first embodiment. Like or the same reference numerals are given to those components that are like or the same as the corresponding components of the first embodiment, and the description is omitted.

In the ignition device 10 of the present embodiment, an energy supply circuit 50 steps up the voltage of the battery 82 and supplies the voltage to the first winding 11*a* and the second winding 11*b* (predetermined winding). The energy supply circuit 50 includes a choke coil 51, a switching element 52, a capacitor 53, a diode 54, a switching element 232, and a switching element 233. The choke coil 51 is connected to the battery 82. The switching element 52 is a semiconductor switching element such as a MOS transistor. The switching element 52 energizes and interrupts a current from the battery 82 to the choke coil 51. The connection and disconnection states of the switching element 52 are controlled by the control circuit 60. Controlling the connection and disconnection states of the switching element 52 allows the capacitor 53 to be charged with electrical energy stored in the choke coil 51. The diode 54 prevents the backflow of electrical energy stored in the capacitor 53 toward the choke coil 51. When the switching element 232 is controlled to be in a connected state, the energy supply circuit 50 supplies the stepped-up voltage (for example, tens to hundreds of volts) to the intermediate tap 16.

The cathode of a diode 241 is connected to a path between the intermediate tap 16 and the diode 42. The anode of the diode 241 is connected to the GND. The end of the second winding 11*b* further from the intermediate tap 16 is connected to the battery 82 through the switching element 233 and a diode 44. The anode of the diode 44 is connected to the battery 82, and the cathode of the diode 44 is connected to the end of the second winding 11*b* further from the intermediate tap 16. The switching element 233 is a semiconductor switching element such as a power transistor and a MOS transistor and is parallel-connected to the diode 44. The connection and disconnection states of the switching element 233 are controlled by the control circuit 60. The diode 44 may be a parasitic diode of the MOS transistor.

The control circuit 60 (controller) selects and executes one of three ignition modes including "main ignition by inductive discharge", "ignition by energy supply", and "multiple ignition by rapid energization".

In the main ignition by inductive discharge, the control circuit 60 controls the switching element 233 to be in the ON state during the time period in which the main ignition signal IGT from the ECU 70 is at the high level (H). Thus, the voltage of the battery 82 is supplied to the first winding 11*a* and the second winding 11*b* of the primary coil 11. At the point in time when the primary current is increased, and the main ignition signal IGT is brought into the low level (L), the control circuit 60 controls the switching element 233 to be in the OFF state. Thus, a high voltage occurs in the primary coil 11 and the secondary coil 21, causing the spark discharge in the ignition plug 80, and the secondary current flows through the secondary coil 21. After that, when the secondary current attenuates and becomes less than the discharge-maintaining current, which is the minimum current that can maintain the discharge, the discharge in the ignition plug 80 ends.

In the ignition by energy supply, the control circuit 60 controls the switching element 233 to be in the ON state after starting the main ignition by inductive discharge as described above. Subsequently, the control circuit 60 controls the switching element 232 to be in the ON state and the OFF state alternately based on the energy supply signal IGW from the ECU 70. Other control methods of the ignition by energy supply are the same as those of the ignition by energy supply of the first embodiment.

In the multiple ignition by rapid energization, the control circuit 60 controls the switching element 232 to be in the ON state after starting the main ignition by inductive discharge as described above. Note that, during the time period in which the main ignition signal IGT from the ECU 70 is at the high level (H), the control circuit 60 steps up the battery voltage and charges the capacitor 53 of the energy supply circuit 50.

After that, the control circuit 60 controls the switching element 31 to be in the ON state during the time period in which a multiple-ignition signal is at the high level (H). At this time, the energy supply circuit 50 supplies the voltage that has been stepped up to be greater than the battery voltage. Thus, the increasing rate of the primary current becomes fast compared with that in the main ignition by inductive discharge, and the primary current in the same direction as that in the main ignition by inductive discharge rapidly flows through the first winding 11*a*. When the primary current increases, and the multiple-ignition signal is brought into the low level (L), the control circuit 60 controls the switching element 31 to be in the OFF state. Thus, the secondary current flows through the secondary coil 21, which causes the spark discharge in the ignition plug 80. After that, the switching element 31 is controlled to be in the ON state and the OFF state alternately based on the multiple-ignition signal at the high level (H) or the low level (L). When the switching element 31 is controlled to be in the ON state and the OFF state for a predetermined number of times, the control circuit 60 controls the switching element 232 to be in the OFF state. Note that, the multiple-ignition signal may be instructed by the control circuit 60 or may be instructed from the ECU 70 to the control circuit 60.

During the main ignition by inductive discharge, the control circuit 60 (controller) uses the falling of the main ignition signal IGT as the interruption signal to interrupt the switching element 31 and start the permission of the current recirculation by the switching element 233 at the falling of the main ignition signal IGT. In this case, a recirculation path 262 including the GND, the diode 241, the second winding 11*b*, the switching element 233, the battery 82, and the GND in this order is formed. Thus, even if a high voltage occurs in the second winding 11*b* included in the primary coil 11, the current is recirculated through the recirculation path, which inhibits excessive voltage stress from being applied to the switching element 233 (energy supply circuit 50). After that, the control circuit 60 ends the permission of the current recirculation by the switching element 233 at the next rising point in time of the main ignition signal IGT. Note that, the switching element 233 and the diode 241 configure the recirculation circuit.

Additionally, the control circuit 60 executes the permission of the current recirculation by the switching element 233 during execution of the ignition by energy supply after the current is interrupted by the switching element 31. In concrete terms, the control circuit 60 maintains the state in which the recirculation of a current through the recirculation path is permitted by the switching element 233 during execution of the ignition by energy supply. Thus, even if a high voltage occurs in the second winding 11*b* included in the primary coil 11, the current is recirculated through the recirculation path. Furthermore, the recirculation path also recirculates the current caused by the induced electromotive force generated in the second winding 11*b* when electrical energy is stopped after being supplied to the second winding 11*b* by the switching element 232. Thus, the recirculation path that recirculates the current during the ignition by energy supply is also used as the recirculation path that recirculates the current when electrical energy is not consumed in the circuit including the secondary coil 21.

Each of the above embodiments may be modified as follows. Like or the same reference numerals are given to those components that are like or the same as the corresponding components of each of the embodiments, and the description is omitted.

The control circuit 60 may use the falling of the main ignition signal IGT as a trigger to start the permission of the current recirculation by the switching element 33 after a predetermined time period (for example, after tens of microseconds) from the falling of the main ignition signal IGT. This prevents the starting of the recirculation operation from being earlier than the main ignition operation and allows the main ignition operation and the recirculation operation after the main ignition to be reliably executed without interfering with each other.

The control circuit 60 may determine the start time of the permission of the current recirculation by the switching element 33 using, as a trigger, a signal (interruption signal) that drives the switching element 31 to the OFF state by the control circuit 60.

The control circuit 60 may set the end time of the permission of the current recirculation by the switching element 33 to the earlier one of the point in time at which the reference time period Ton has elapsed and the rising point in time of the main ignition signal IGT. Thus, the permission of the current recirculation is easily and reliably ended.

The ECU 70 may perform the function of the control circuit 60.

Although the present disclosure has been described in accordance with the embodiments, it is understood that the present disclosure is not limited to the embodiments and the configurations. The present disclosure embraces various modifications and deformations that come within the range of equivalency. Additionally, various combinations and forms, or other combinations and forms including only one or more additional elements, or less than all elements are included in the scope and ideas obtainable from the present disclosure.

What is claimed is:

1. An ignition device for an internal combustion engine, comprising:

an ignition plug;

a primary coil that includes a predetermined winding;

a secondary coil configured to be magnetically linked to the primary coil and be connected to the ignition plug;

a main ignition circuit configured to supply and interrupt a current through the primary coil to accordingly cause a spark discharge to occur in the ignition plug;

an energy supply circuit configured to supply and stop electrical energy to the predetermined winding of the primary coil to accordingly cause the spark discharge to continue;

a recirculation circuit configured to permit and prohibit current recirculation through a recirculation path including the predetermined winding and the recirculation circuit, wherein a current recirculated in the recirculation path is configured to be conducted from an end of the predetermined winding through the recirculation circuit and then to another end of the predetermined winding; and a controller configured to:

control the main ignition circuit, send an interruption signal to the main ignition circuit to thereby cause the main ignition circuit to interrupt the current through the primary coil, and determine a start time of a permission of the current recirculation by the recirculation circuit using, as a trigger, the interruption signal, and start the permission of the current recirculation at the determined start time when the current through the primary coil is interrupted, and end the permission after a predetermined time period has elapsed since the start time.

2. The ignition device for an internal combustion engine according to claim 1, wherein the controller is configured to set an end time of the permission of the current recirculation by the recirculation circuit to be before the main ignition circuit starting the supply of a current through the primary coil next time.

3. The ignition device for an internal combustion engine according to claim 1, wherein the controller is configured to execute the permission of the current recirculation by the recirculation circuit in response to the energy supply circuit failing to execute ignition by energy supply to cause the spark discharge to continue, after the current through the primary coil is interrupted by the main ignition circuit.

4. The ignition device for an internal combustion engine according to claim 1, wherein the controller is configured to execute the permission of the current recirculation by the recirculation circuit, in response to the energy supply circuit executing ignition by energy supply to cause the spark discharge to continue, after the current through the primary coil is interrupted by the main ignition circuit.

5. The ignition device for an internal combustion engine according to claim 4, wherein, the controller is configured to, in response to execution of the ignition by energy supply, maintain a state in which current recirculation through the recirculation path is permitted by the recirculation circuit, and cause the energy supply circuit to supply and stop the electrical energy to the predetermined winding.

6. The ignition device for an internal combustion engine according to claim 1, wherein the controller is further configured to:

- receive a main ignition signal of a high level or a low level; and
- end the permission of the current recirculation by the recirculation circuit at a rising of the main ignition signal.

7. The ignition device for an internal combustion engine according to claim 1, wherein the controller is further configured to end the permission of the current recirculation by the recirculation circuit at a time at which a supply of the current is started by the main ignition circuit.

8. The ignition device for an internal combustion engine according to claim 1, wherein the controller is further configured to provide only a single permission of the current recirculation by the recirculation circuit before the main ignition circuit starts the supply of the current through the primary coil next time.

9. An ignition device for an internal combustion engine, comprising:

- an ignition plug;
- a primary coil that includes a predetermined winding;
- a secondary coil configured to be magnetically linked to the primary coil and be connected to the ignition plug;
- a main ignition circuit configured to supply and interrupt a current through the primary coil to accordingly cause a spark discharge to occur in the ignition plug;
- an energy supply circuit configured to supply and stop electrical energy to the predeterminded winding of the primary coil to accordingly cause the spark discharge to continue;
- a recirculation circuit configured to permit and prohibit current recirculation through a recirculation path including the predetermined winding; and
- a controller configured to:
  - control the main ignition circuit,
  - send an interruption signal to the main ignition circuit to thereby cause the main ignition circuit to interrupt the current through the primary coil, and
  - determine a start time of a permission of the current recirculation by the recirculation circuit using, as a trigger, the interruption signal, and start the permission of the current recirculation at the determined start time when the current through the primary coil is interrupted, and
  - end the permission after a predetermined time period has elapsed since the start time;
- wherein the controller is further configured to:
  - receive a main ignition signal of a high level or a low level,
  - energize the main ignition circuit at rising of the main ignition signal, and
  - use falling of the main ignition signal as the interruption signal to interrupt the main ignition circuit and start the permission of the current recirculation by the recirculation circuit at the falling of the main ignition signal.

10. The ignition device for an internal combustion engine according to claim 9, wherein the controller is configured to end the permission of the current recirculation by the recirculation circuit at the next rising of the main ignition signal.

11. An ignition device for an internal combustion engine comprising:

- an ignition plug;
- a primary coil that includes a predetermined winding;
- a secondary coil configured to be magnetically linked to the primary coil and be connected to the ignition plug;
- a main ignition circuit configured to supply and interrupt a current through the primary coil to accordingly cause a spark discharge to occur in the ignition plug;
- an energy supply circuit configured to supply and stop electrical energy to the predetermined winding of the primary coil to accordingly cause the spark discharge to continue;
- a recirculation circuit configured to permit and prohibit current recirculation through a recirculation path including the predetermined winding; and
- a controller configured to:
  - control the main ignition circuit,
  - start a permission of the current recirculation by the recirculation circuit after when the current through the primary coil is interrupted by the main ignition circuit, and
  - set an end time of the permission of the current recirculation to be before the main ignition circuit starts the supply of a current through the primary coil next time.

12. The ignition device for an internal combustion engine according to claim 11, wherein the controller is configured to:

- receive a main ignition signal of a high level or a low level,
- energize the main ignition circuit at rising of the main ignition signal,
- interrupt the main ignition circuit at falling of the main ignition signal, and
- end the permission of the current recirculation by the recirculation circuit at the next rising of the main ignition signal.

13. The ignition device for an internal combustion engine according to claim 11, wherein the controller is further configured to:

- receive a main ignition signal of a high level or a low level; and
- end the permission of the current recirculation by the recirculation circuit at a rising of the main ignition signal.

14. The ignition device for an internal combustion engine according to claim 11, wherein the controller is further configured to end the permission of the current recirculation by the recirculation circuit at a time at which a supply of the current is started by the main ignition circuit.

15. The ignition device for an internal combustion engine according to claim 11, wherein the controller is further configured to provide only a single permission of the current recirculation by the recirculation circuit before the main ignition circuit starts the supply of the current through the primary coil next time.

* * * * *